(12) United States Patent
Qin et al.

(10) Patent No.: US 8,478,204 B2
(45) Date of Patent: Jul. 2, 2013

(54) SYSTEM AND METHOD FOR ANTENNA TRAINING OF BEAMFORMING VECTORS HAVING REUSE OF DIRECTIONAL INFORMATION

(75) Inventors: Xiangping Qin, San Jose, CA (US); Pengfei Xia, Mountain View, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1387 days.

(21) Appl. No.: 12/172,853

(22) Filed: Jul. 14, 2008

(65) Prior Publication Data

US 2010/0009635 A1 Jan. 14, 2010

(51) Int. Cl.
*H04B 1/00* (2006.01)
*H04B 7/00* (2006.01)

(52) U.S. Cl.
USPC ............... 455/69; 455/68; 455/25; 455/63.1; 455/63.4; 455/67.11; 455/67.13; 455/101; 375/232; 375/233; 342/360; 342/367

(58) Field of Classification Search
USPC .......... 455/24–25, 63.1, 63.4, 65, 67.11, 455/67.13, 67.14, 67.16, 68–69, 522, 41.2, 455/561, 562.1, 101, 114.2, 120–125, 132, 455/135, 226.1–226.3, 296; 375/229–233; 342/350, 359, 360, 367, 368, 372–374, 378, 342/417, 422–423
See application file for complete search history.

(56) References Cited

U.S. PATENT DOCUMENTS

| 4,696,053 | A | | 9/1987 | Mastriani et al. |
| 5,955,991 | A | | 9/1999 | Kawakubo |
| 6,009,124 | A | * | 12/1999 | Smith et al. ................... 375/267 |
| 6,470,195 | B1 | | 10/2002 | Meyer |

(Continued)

FOREIGN PATENT DOCUMENTS

| JP | 1267501 A | 12/2002 |
| JP | 2004/140642 A2 | 5/2004 |

(Continued)

OTHER PUBLICATIONS

Butler et al., "Beam-Forming Matrix Simplifies Design of Electronically Scanned Antennas." Electronic Design, Apr. 12, 1961, pp. 170-173.

(Continued)

*Primary Examiner* — Tuan A Tran
(74) *Attorney, Agent, or Firm* — Kenneth L. Sherman, Esq.; Michael Zarrabian, Esq.; Sherman & Zarrabian LLP

(57) ABSTRACT

A system and method for reusing existing directional information to configure antennas in a wireless network is disclosed. The method includes retrieving existing directional information, the existing directional information having been established in a previous antenna training session with a receiver. The method further includes performing a signal-to-noise ratio (SNR) estimation procedure comprising: transmitting an SNR estimation probe message to the receiver via a directional antenna tuned with the existing directional information, and determining whether an estimated SNR value associated with the SNR estimation probe message is equal to or greater than a threshold SNR value. The method further includes transmitting a data message to the receiver via the directional antenna tuned with the existing directional information if it is determined that the estimated SNR value is equal to or greater than the threshold SNR value.

29 Claims, 5 Drawing Sheets

U.S. PATENT DOCUMENTS

| | | | |
|---|---|---|---|
| 6,570,864 B1 | 5/2003 | Kim et al. | |
| 6,590,532 B1 | 7/2003 | Ogawa et al. | |
| 6,639,551 B2 * | 10/2003 | Li et al. | 342/381 |
| 6,671,265 B1 * | 12/2003 | Hwang et al. | 370/331 |
| 6,677,898 B2 | 1/2004 | Cheng et al. | |
| 6,701,165 B1 * | 3/2004 | Ho et al. | 455/562.1 |
| 6,721,908 B1 | 4/2004 | Kim et al. | |
| 6,731,689 B2 | 5/2004 | Dogan | |
| 6,795,392 B1 | 9/2004 | Li et al. | |
| 6,832,080 B1 | 12/2004 | Arslan et al. | |
| 6,847,832 B2 | 1/2005 | Wong et al. | |
| 6,879,624 B2 | 4/2005 | Sano | |
| 6,925,131 B2 | 8/2005 | Balakrishnan et al. | |
| 6,937,189 B2 | 8/2005 | Kim | |
| 6,959,047 B1 | 10/2005 | Al-Dhahir et al. | |
| 6,982,968 B1 * | 1/2006 | Barratt et al. | 370/328 |
| 6,985,466 B1 * | 1/2006 | Yun et al. | 370/335 |
| 7,013,165 B2 | 3/2006 | Yoon et al. | |
| 7,039,370 B2 | 5/2006 | Laroia et al. | |
| 7,065,149 B2 | 6/2006 | Ghavami et al. | |
| 7,096,041 B2 | 8/2006 | Brunner et al. | |
| 7,099,630 B2 | 8/2006 | Brunner et al. | |
| 7,099,678 B2 | 8/2006 | Vaidyanathan | |
| 7,103,383 B2 | 9/2006 | Ito | |
| 7,148,845 B2 | 12/2006 | Rooyen et al. | |
| 7,161,534 B2 | 1/2007 | Tsai et al. | |
| 7,194,237 B2 | 3/2007 | Sugar | |
| 7,227,906 B2 | 6/2007 | Fukuda et al. | |
| 7,236,759 B2 * | 6/2007 | Cha et al. | 455/275 |
| 7,239,893 B2 | 7/2007 | Yang | |
| 7,245,880 B1 * | 7/2007 | Jacobsen | 455/69 |
| 7,312,750 B2 * | 12/2007 | Mao et al. | 342/377 |
| 7,342,535 B2 | 3/2008 | Ann et al. | |
| 7,411,547 B2 | 8/2008 | Van Rooyen et al. | |
| 7,446,698 B2 | 11/2008 | Bast | |
| 7,447,270 B1 | 11/2008 | Hottinen | |
| 7,450,659 B2 | 11/2008 | Corredoura et al. | |
| 7,480,497 B2 | 1/2009 | Biswas et al. | |
| 7,539,458 B2 | 5/2009 | Jafarkhani et al. | |
| 7,547,778 B2 | 6/2009 | Balducci et al. | |
| 7,583,982 B2 | 9/2009 | Olesen et al. | |
| 7,587,173 B2 * | 9/2009 | Hoffmann et al. | 455/63.4 |
| 7,605,755 B2 | 10/2009 | Van Rooyen et al. | |
| 7,609,648 B2 * | 10/2009 | Hoffmann et al. | 370/252 |
| 7,627,051 B2 | 12/2009 | Shen et al. | |
| 7,633,994 B2 | 12/2009 | Forenza et al. | |
| 7,657,244 B2 | 2/2010 | Niu et al. | |
| 7,668,255 B1 | 2/2010 | Al-Dhahir et al. | |
| 7,697,602 B2 | 4/2010 | Frey et al. | |
| 7,702,028 B2 | 4/2010 | Zhou et al. | |
| 7,710,925 B2 | 5/2010 | Poon | |
| 7,761,059 B2 | 7/2010 | Lau | |
| 7,801,238 B2 | 9/2010 | Borst et al. | |
| 7,813,442 B2 | 10/2010 | Gaikwad | |
| 7,826,559 B2 | 11/2010 | Al-Dhahir et al. | |
| 7,839,819 B2 | 11/2010 | Kim | |
| 7,847,732 B1 | 12/2010 | Nabar et al. | |
| 7,881,396 B2 | 2/2011 | Zhou et al. | |
| 7,916,081 B2 | 3/2011 | Lakkis | |
| 2002/0122498 A1 | 9/2002 | Dogan | |
| 2002/0147032 A1 | 10/2002 | Yoon et al. | |
| 2003/0201936 A1 | 10/2003 | Kim | |
| 2003/0228857 A1 * | 12/2003 | Maeki | 455/278.1 |
| 2004/0085939 A1 | 5/2004 | Wallace et al. | |
| 2004/0174298 A1 * | 9/2004 | Eriksson | 342/359 |
| 2004/0218581 A1 | 11/2004 | Cattaneo | |
| 2004/0242156 A1 | 12/2004 | Tiirola et al. | |
| 2004/0247038 A1 | 12/2004 | Uesugi et al. | |
| 2005/0068231 A1 | 3/2005 | Regnier et al. | |
| 2005/0128953 A1 | 6/2005 | Wallace et al. | |
| 2005/0206564 A1 | 9/2005 | Mao et al. | |
| 2005/0276347 A1 | 12/2005 | Mujtaba et al. | |
| 2006/0012520 A1 | 1/2006 | Tsai et al. | |
| 2006/0104382 A1 | 5/2006 | Yang et al. | |
| 2006/0234645 A1 | 10/2006 | Lin et al. | |
| 2006/0248429 A1 | 11/2006 | Grandhi et al. | |
| 2007/0189412 A1 | 8/2007 | Xia et al. | |
| 2007/0205943 A1 | 9/2007 | Nassiri-Toussi et al. | |
| 2008/0101493 A1 | 5/2008 | Niu et al. | |
| 2008/0101497 A1 | 5/2008 | Gaikwad et al. | |
| 2008/0108390 A1 | 5/2008 | Yoon et al. | |
| 2008/0134254 A1 | 6/2008 | Xia et al. | |
| 2008/0144751 A1 | 6/2008 | Xia et al. | |
| 2008/0204319 A1 | 8/2008 | Niu et al. | |
| 2009/0033555 A1 | 2/2009 | Niu et al. | |
| 2009/0046010 A1 | 2/2009 | Niu et al. | |
| 2009/0046012 A1 | 2/2009 | Niu et al. | |
| 2009/0047910 A1 | 2/2009 | Niu et al. | |
| 2009/0058724 A1 | 3/2009 | Xia et al. | |
| 2009/0121935 A1 | 5/2009 | Xia et al. | |
| 2009/0189812 A1 | 7/2009 | Xia et al. | |
| 2009/0193300 A1 | 7/2009 | Xia et al. | |
| 2009/0233556 A1 | 9/2009 | Xia et al. | |
| 2009/0238156 A1 | 9/2009 | Yong et al. | |
| 2011/0237196 A1 | 9/2011 | Niu et al. | |

FOREIGN PATENT DOCUMENTS

| | | |
|---|---|---|
| KR | 2000/0071545 A | 11/2000 |
| KR | 2001/0015765 | 2/2001 |
| KR | 2001/0018995 A | 3/2001 |
| KR | 2002/0022109 A | 3/2002 |
| KR | 2006/0068921 A | 6/2006 |
| WO | WO 01/17131 | 3/2001 |
| WO | WO 03/090386 | 10/2003 |

OTHER PUBLICATIONS

Buzzi S. et al., Performance of iterative data detection and channel estimation for single-antenna and multiple-antennae wireless communications, IEEE Transactions on Vehicular Technology, Jul. 2004, 53(4): 1085-1104.

Caetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf], pp. 1-6.

Coffey, S. et al., "Joint Proposal: High throughput extension to the 802.11 Standard: PHY" IEEE 802.11-05/1102r4, draft proposal, Jan. 2006, pp. 1-82.

De Los Santos, "MEMS-Based Microwave Circuits and Systems, Introduction to Microelectromechanical (MEM) Microwave Systems," Artech House, p. 167-168 and 193, 1999.

Furrer et al., Bounds on the ergodic capacity of training-based multiple-antenna systems, Proceedings, Internal Symposium on Information Theory, ISIT, Sep. 2005, p. 780-784.

Hansen, R.C., Phased Array Antennas, John Wiley and Songs, New York, 1998, pp. 1-507.

Hitachi et al., High-Definition Multimedia Interface (HDMI) Specifications version 1.2, Aug. 22, 2005, pp. 1-214.

IEEE 802.11 Working Group of the 802 Committee, "Draft Amendment to Standard for Information Technology-Telecommunications and information exchange between systems-Local and metropolitan are networks—Specific requirements—Part 11: Wireless LAN Medium Access Control (MAC) and Physical Layer (PHY) specifications: Enhancements for Higher Throughput," IEEE P802.11n/D1. 0, Mar. 2006, pp. 1-335.

Lin et al., Error Control Coding—Fundamentals and Applications, 2nd Edition, Pearson Prentice Hall, 2004, Chapter 16, pp. 774-780.

Niu et al., "Beamforming for Space-Time Coded IEEE 802.11n System with Known Fading Correlations," in Proceeding of 39th Asilomar Conference on Signals, Systems and Computers, Pacific Grove, CA, Nov. 2005.

Project: IEEE P802.15 Working Group for Wireless Personnel Area Networks (WPANs), Presentations, Nov. 12, 2006 & Jan. 15, 2008, pp. 1-64.

Razavi, B., "Challenges in Portable RF Transceiver Design." Circuits & Devices, 8755-3996/96, IEEE, Sep. 1996, pp. 12-24.

Rye et al., On Quadratic Inverses for Quadratic Permutation Polynomials Over Integer Rings, IEEE Trans. On Information Theory, Mar. 2006, 52(3): 1-12.

Scintera, "Advanced Signal Processing Platform," Scintera Networks, Sep. 2003, pp. 1-9.

Stüber, G. et al., "Broadband MIMO-OFDM Wireless Communications", Proceedings of the IEEE, vol. 92, No. 2, Feb. 2004, pp. 271-294.

Takeshita et al., On Maximum Contention-Free Interleavers and Permutation Polynomials Over Integer Rings, IEEE Trans. On Information Theory, Mar. 2006, 52(3): 1-13.

Van Veen et al., Beamforming: A Versatile Approach to Spatial Filtering, IEEE ASSP Magazine, Apr. 1988, 5(2): 4-24.

International Search Report and Written Opinion dated Aug. 28, 2009 for PCT/KR2009/000365, filed Jan. 23, 2009.

International Search Report dated Jun. 29, 2009 for PCT Application No. PCT/KR2009/000373, filed Jan. 23, 2009.

International Search Report dated Sep. 16, 2009 for PCT Application No. PCT/KR2009/00576, filed Feb. 6, 2009.

U.S. Office Action dated Jun. 23, 2008 in U.S. Appl. No. 11/890,207, filed Aug. 2, 2007.

U.S. Office Action dated Nov. 24, 2008 in U.S. Appl. No. 11/890,207, filed Aug. 2, 2007.

U.S. Advisory Action dated Mar. 2, 2009 in U.S. Appl. No. 11/890,207, filed Aug. 2, 2007.

U.S. Office Action dated Apr. 6, 2009 in U.S. Appl. No. 11/890,207, filed Aug. 2, 2007.

U.S. Office Action dated Jul. 25, 2008 in U.S. Appl. No. 11/881,978, filed Jul. 30, 2007.

U.S. Office Action dated Jan. 2, 2009 in U.S. Appl. No. 11/881,978, filed Jul. 30, 2007.

U.S. Notice of Allowance dated Sep. 15, 2009 in U.S. Appl. No. 11/881,978, filed Jul. 30, 2007.

U.S. Office Action dated Sep. 24, 2009 in U.S. Appl. No. 11/899,286, filed Sep. 5, 2007.

U.S. Notice of Allowance dated Jan. 21, 2010 in U.S. Appl. No. 11/899,286, filed Sep. 5, 2007.

U.S. Office Action dated Oct. 15, 2009 in U.S. Appl. No. 11/706,942, filed Feb. 13, 2007.

Hachman, "CE Giants back Amimon's Wireless HDTV Tech," *PCMAG.com*, 1 page (Jul. 23, 2008).

IEEE 802.15.3: Wireless Medium Access Control (MAC) and Physical Layer (PHY) Specifications for High Rate Wireless Personal Area Networks (WPANs), Sep. 29, 2003.

"NEC develops compact millimeter-wave transceiver for uncompressed HDTV signal transmission," *NE Asia Online*, Apr. 5, 2005, (Downloaded from http://neasia.nkkeibo.com/topstory/000913 on Sep. 29, 2006.

WirelessHD Specification Version 1.0 Overview, Oct. 9, 2007, 77 pages.

LG Electronics, Inc. et al., "WirelessHD Specification Specification Summary," WirelessHD, LLC, Feb. 2007, pp. 1-8, United States.

International Search Report and Written Opinion dated May 25, 2007 for International Application No. PCT/KR2007/000830, filed Feb. 15, 2007, pp. 1-10, Seo-gu, Daejeon, Republic of Korea.

Mexican Notice of Allowance dated Sep. 28, 2010 for Mexican Application No. MX/A/2008/009667 corresponding to International Application PCT/KR2007/000830, pp. 1-2, Mexican Institute of Industrial Property, Mexico (Machine-generated English-language translation attached, p. 1).

U.S. Notice of Allowance for U.S. Appl. No. 11/890,207 mailed Jan. 11, 2010.

U.S. Non-Final Office Action for U.S. Appl. No. 11/881,978 mailed May 20, 2010 by Phan, Dao Linda.

U.S. Notice of Allowance for U.S. Appl. No. 11/881,978 mailed Oct. 28, 2010.

U.S. Non-Final Office Action for U.S. Appl. No. 12/050,071 mailed Apr. 27, 2011.

U.S. Final Office Action for U.S. Appl. No. 12/050,071 mailed Oct. 26, 2011.

U.S. Notice of Allowance for U.S. Appl. No. 12/189,747 mailed Mar. 18, 2011.

U.S. Notice of Allowance for U.S. Appl. No. 12/189,749 mailed Dec. 29, 2010.

U.S. Non-Final Office Action for U.S. Appl. No. 12/189,726 mailed Dec. 13, 2011.

U.S. Non-Final Office Action for U.S. Appl. No. 13/154,326 mailed May 16, 2012.

U.S. Notice of Allowance for U.S. Appl. No. 12/189,726 mailed Apr. 26, 2012.

U.S. Notice of Allowance for U.S. Appl. No. 12/050,071 mailed Nov. 7, 2012.

U.S. Final Office Action for U.S. Appl. No. 13/154,326 mailed Oct. 31, 2012.

Novak, H., "Switched-Beam Adaptive Antenna System", Dissertation, Nov. 1999, pp. 1-130, Vienna University of Technology, Austria.

* cited by examiner

SYSTEM AND METHOD FOR ANTENNA TRAINING OF BEAMFORMING VECTORS HAVING REUSE OF DIRECTIONAL INFORMATION

BACKGROUND OF THE INVENTION

1. Field of the Invention

The present invention relates to wireless networks, and in particular to reusing antenna parameters in beamforming and sector antennas.

2. Description of the Related Technology

With the proliferation of high quality video, an increasing number of electronic devices, such as consumer electronic devices, utilize high definition (HD) video which can require multiple gigabit per second (Gbps) or more in data rate, hence high bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be lowered.

The High-Definition Multimedia Interface (HDMI) specification allows transfer of compressed or uncompressed HD Audio and/or Video (A/V) data between devices via a cable. While consumer electronics makers are beginning to offer HDMI-compatible equipment, there is not yet a suitable wireless (e.g., radio frequency) technology that is capable of transmitting compressed or uncompressed HD video signals. Wireless local area network (WLAN) and similar technologies can suffer interference issues and the bandwidth is not enough to carry the compressed or uncompressed HD A/V data.

Recently, millimeter wave (mm-wave) Gbps communication is becoming a reality with technological advances and regulatory developments. For example, in early 2000, Federal Communications Commission (FCC) allocated a 7 GHz frequency band in the 57-64 GHz mm-wave band (also known as the 60 GHz frequency band) for unlicensed use. Opening of this large frequency band, combined with advances in CMOS technologies, makes it attractive to support gigabit per second (Gbps) wireless applications, such as compressed or uncompressed high definition video streaming and large file transfers.

One of the major challenges for mm-wave Gbps communications is the poor link budget, as a radio signal propagating in the mm-wave frequency band experiences significant path loss, reflection loss and other degradation. Also, the 60 GHz frequency band happens to be in an oxygen absorption band, which means that transmitted energy is quickly absorbed by oxygen molecules in the atmosphere, making the received signal even weaker.

Given the lossy nature of the radio channel as well as the limited CMOS performance at a mm-wave band, Gbps communications becomes very challenging. To improve the link quality, directional transmission is generally preferred. Due to the extremely short wavelength, it becomes possible and beneficial to integrate a large number (e.g., between 10 and 30) of antenna elements into an antenna array package. Antenna array based beamforming thus emerges as an attractive solution, featuring high beamforming gain and electronic steerability. In current practice of 60 GHz communications, a single RF chain is generally preferred for cost reduction consideration. For an orthogonal frequency division multiplexing (OFDM) based system, this implies that conventional digital beamforming which employs independent beamforming vectors across multiple subcarriers cannot be applied. Analog beamforming, which employs the same beamforming vector across multiple subcarriers, are used instead. An improvement in signal-to-noise (S/N) ratio can be achieved by periodically performing antenna trainings in a beamforming wireless system. However, antenna training incurs overhead and delays and reduces channel use efficiency.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly.

In one embodiment, there is a method of reusing existing directional information to configure antennas in a wireless network, the method comprising retrieving existing directional information, the existing directional information having been established in a previous antenna training session with a receiver; performing a signal-to-noise ratio (SNR) estimation procedure comprising transmitting an SNR estimation probe message to the receiver via a directional antenna tuned with the existing directional information, and determining whether an estimated SNR value associated with the SNR estimation probe message is equal to or greater than a threshold SNR value; and transmitting a data message to the receiver via the directional antenna tuned with the existing directional information if it is determined that the estimated SNR value is equal to or greater than the threshold SNR value.

In another embodiment, there is a method of reusing existing directional information to configure antennas in a wireless network, the method comprising retrieving existing directional information, the existing directional information having been established in a previous antenna training session with a transmitter; performing a signal-to-noise ratio (SNR) estimation procedure comprising receiving a SNR estimation probe message from the transmitter via a directional antenna tuned with the existing directional information, and estimating a SNR value associated with the received SNR estimation probe message; and receiving data from the transmitter via the directional antenna tuned with the existing directional information if it is determined that the estimated SNR value is equal to or greater than a threshold SNR value.

In another embodiment, there is a data communication station in a wireless network comprising a memory configured to store existing directional information, the existing directional information having been established in a previous training session with a receiver; a processor in data communication with the memory and configured to retrieve the existing directional information, and determine whether an estimated SNR value associated with a SNR estimation probe message transmitted to a receiver equal to or greater than a threshold SNR value; and a directional antenna in data communication with the processor and configured to transmit data to the receiver after having been trained with the existing directional information if it is determined that the estimated SNR value is equal to or greater than the threshold SNR value.

In another embodiment, there is a data communication station in a wireless network comprising a memory configured to store existing directional information, the existing directional information having been established in a previous training session with a transmitter; a processor in data communication with the memory and configured to retrieve the existing directional information, estimate a SNR value associated with a received SNR estimation signal, and determine whether the estimated SNR value is equal to or greater than a threshold SNR value; and a directional antenna in data communication with the processor and configured to receive data packets from the transmitter after having been trained with the existing directional information if it is determined that the estimated SNR value is equal to or greater than the threshold SNR value.

In another embodiment, there is a data communication station in a wireless network comprising a data storage configured to store existing directional information, and a processor configured to execute at least part of a computer algorithm configured to determine whether to reuse the existing directional information to tune a directional antenna for data communication based at least in part on whether a signal-to-noise ratio (SNR) estimation probe message transmitted or received via one or more directional antennas tuned with the existing directional information yields an estimated SNR value that is equal to or greater than a threshold SNR value.

DETAILED DESCRIPTION OF CERTAIN INVENTIVE EMBODIMENTS

Certain embodiments provide a method and system for reusing existing directional information obtained from a previous antenna training session between two stations in a wireless network. In some embodiments, the efficiency of the wireless network is improved by directional information reuse scheme to be described below. In some embodiments, the directional informational reuse scheme includes estimating signal-to-noise ratio of a signal transmitted and received with antennas tuned with the existing directional information.

The following detailed description is directed to certain sample embodiments of the invention. However, the invention can be embodied in a multitude of different ways as defined and covered by the claims. In this description, reference is made to the drawings wherein like parts are designated with like numerals throughout.

Embodiments including systems and methods of data processing in wireless communication devices for communication of compressed or uncompressed video data will be described. Video data may include one or more of motion video, still images, or any other suitable type of visual data. In particular, various embodiments representing one or more novel directional information reuse schemes for efficient communication of compressed or uncompressed video data will be described.

Figure 1:
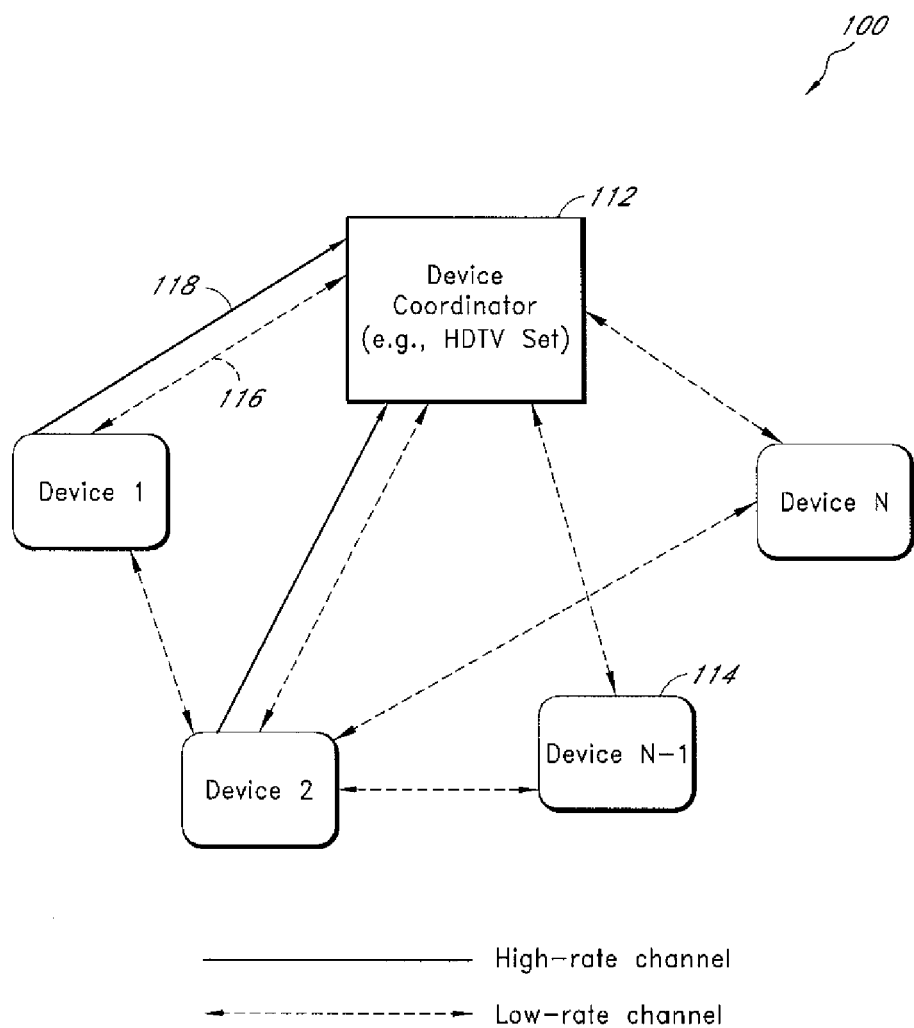
FIG. 1 is a functional block diagram of an exemplary configuration of a wireless network that implements compressed or uncompressed HD video transmission between wireless devices according to one embodiment of the system and method.

Exemplary implementations of the embodiments in a wireless high definition (HD) audio/video (A/V) system will now be described. FIG. 1 shows a functional block diagram of a wireless network 100 that implements compressed or uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple client devices or A/V stations 114 (e.g., Device 1 . . . Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-Gb/s bandwidth, to support compressed or uncompressed HD video transmission. For example, a set-top box can transmit compressed or uncompressed video to a HD television (HDTV) over the high-rate channel 118. The low-rate channel 116 can support bidirectional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (referred to as "receiver 112"), and the station 114 is a sender of the video information (referred to as "sender 114"). For example, the receiver 112 can be a sink of video and/or audio data implemented, such as, in an HDTV set in a home wireless network environment which is a type of WLAN. The sender 114 can be a source of compressed or uncompressed video or audio. Examples of the sender 114 include a set-top box, a DVD player or recorder, a digital camera, a camcorder, and so forth.

Figure 2:
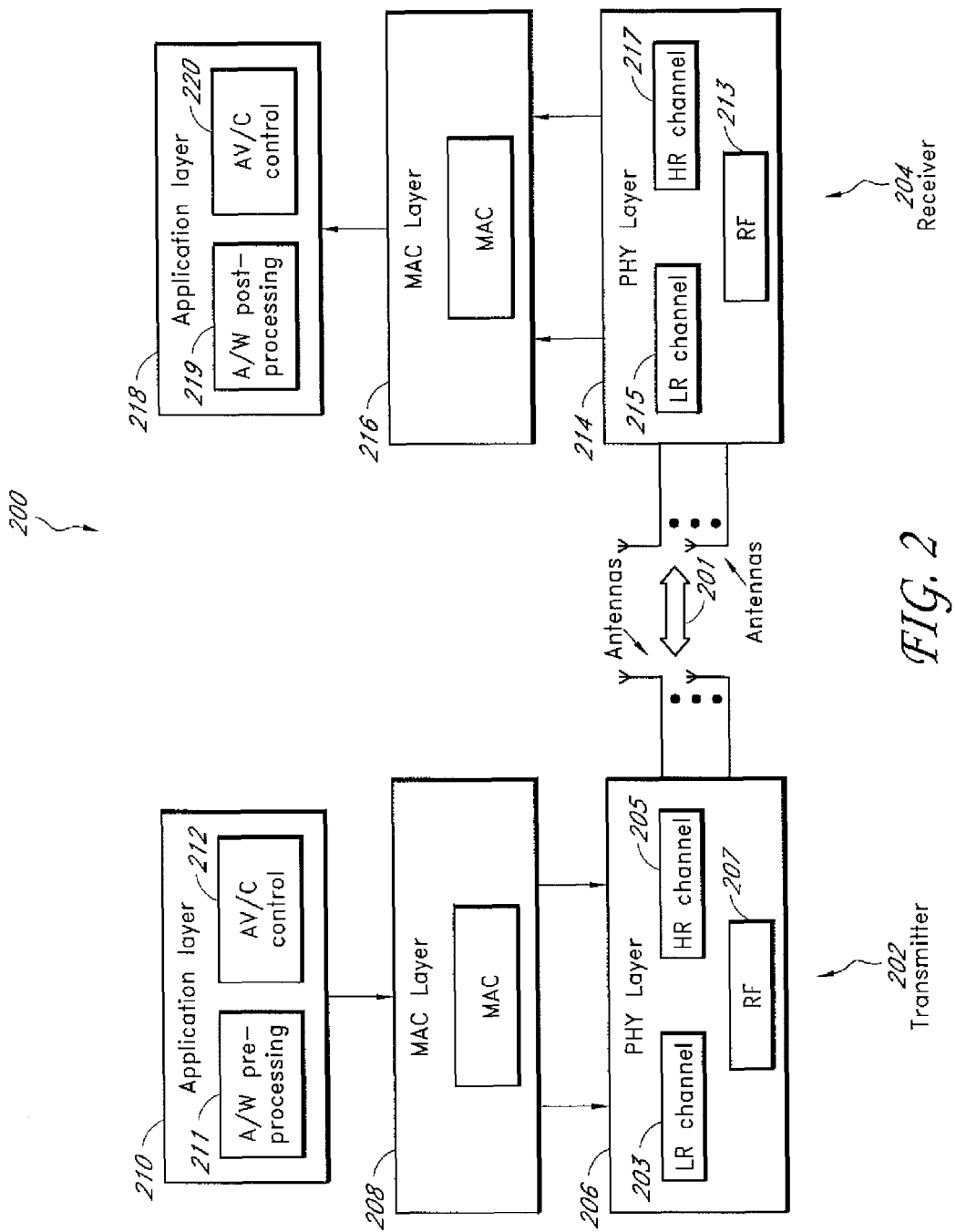
FIG. 2 is a functional block diagram of an example communication system for transmission of compressed or uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of compressed or uncompressed video. The AV/C module 212 provides a standard way to exchange A/V capability information. Before a connection begins, the AV/C module negotiates the A/V formats to be used, and when the transmission is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216 process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the compressed or uncompressed video, for example. The AV/C module 220 operates in a complementary way with the AV/C module 212 of the transmitter 202.

Figure 3:
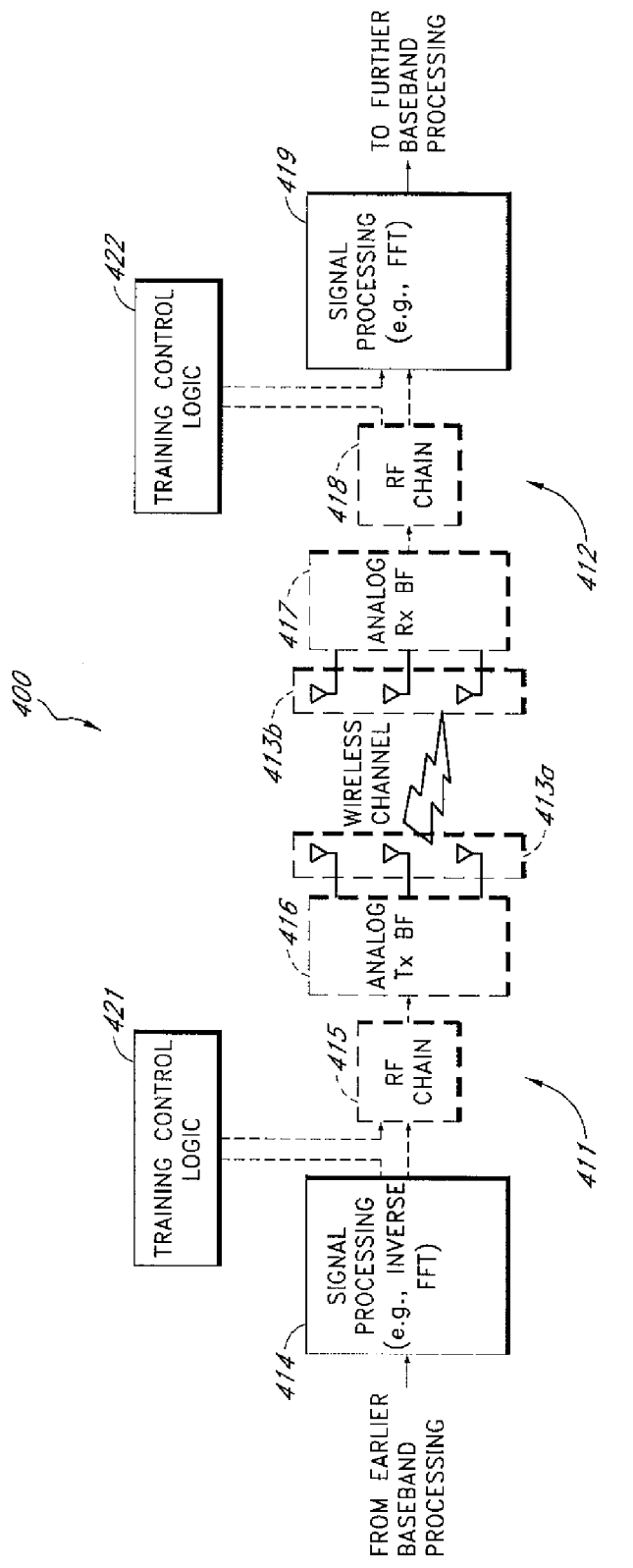
FIG. 3 is a functional block diagram of an example beamforming wireless system comprising two beamforming stations—a transmitter and a receiver—that are configured to perform an antenna training session prior to transmitting audio and/or video (A/V) data.

As shown in FIG. 1, coordinator 112 and devices or stations 114 can communicate with each other via directional transmissions. These directional transmissions can be done via sector antennas or beamforming antenna arrays. In certain embodiments, before a pair of stations (such as the transmit and receiver illustrated in FIG. 3) engage in data communications, the stations need to perform an antenna training process to improve signal-to-noise ratio (SNR). In some embodiments, each of the transmitter and receiver contains a beamforming antenna array comprising multiple antenna elements. In some embodiments, the antenna array is a phased antenna array. In other embodiments, the antenna array is a switched antenna array. The antenna training may include training of the antenna array coefficients at both the transmitter and the receiver. As used herein, beamforming includes selecting or changing a receive/transmit directionality of an array of antennas. FIG. 3 is a functional block diagram of an example beamforming wireless system 300 comprising two beamforming stations—a transmitter 311 and a receiver 312—that are configured to perform an antenna training session prior to transmitting A/V data. The transmitter and receiver 311 and 312 include antenna arrays 313a and 313b, respectively.

The transmit (TX) function of the transmitter 311 includes a signal processing module 314. The signal processing module 314 receives a baseband signal, that has undergone an earlier baseband processing, and may perform an inverse Fast Fourier Transform (IFFT) which converts the signal from the frequency domain into a time domain digital signal. In certain embodiments, the signal processing module 314 can include a processor (not shown), e.g., a microprocessor, a digital signal processor (DSP), a programmable gate array (PGA) and the like, for performing the IFFT. The digital signal is then converted into an analog waveform by a digital to analog (D/A) function of an RF chain 315, and then transmitted to the receiver 312 via an antenna array 313a after analog beamforming (BF) by an analog TX BF function module 316. The transmitter 311 can also include a training control module 321 that is used during an antenna training session. During an antenna training session, the digital signal output from the signal processing module 314 is bypassed to the training control module 321 where an iterative antenna training algorithm can be used to construct antenna beamforming vectors.

During the antenna training session, the training control module 321 generates one or more training sequences. The training sequence then flows into the RF chain 315, where it is converted into an analog waveform, and transmitted to the receiver 312 as described above.

The receive (RX) function of the receiver 312 includes an analog RX BF function module 317. A signal transmitted from the transmitter 311 is received by the receiver 312 via the antenna array 313b. The received signal flows into the analog RX BF function 317. The analog output signal from the analog RX BF function 317 is converted to a digital signal in an RF chain 318, and may then be converted to a frequency domain baseband signal by, for example, an FFT module inside a signal processing module 319. The baseband signal is then output for a further baseband processing. The receiver 312 can also include its own training control module 322 that is used during an antenna training session. During the antenna training session, a digital signal representing a training sequence received from the transmitter 311 is bypassed to the training control module 322 where at least a part of an iterative antenna training algorithm for constructing a beamforming vector is applied.

Figure 4:
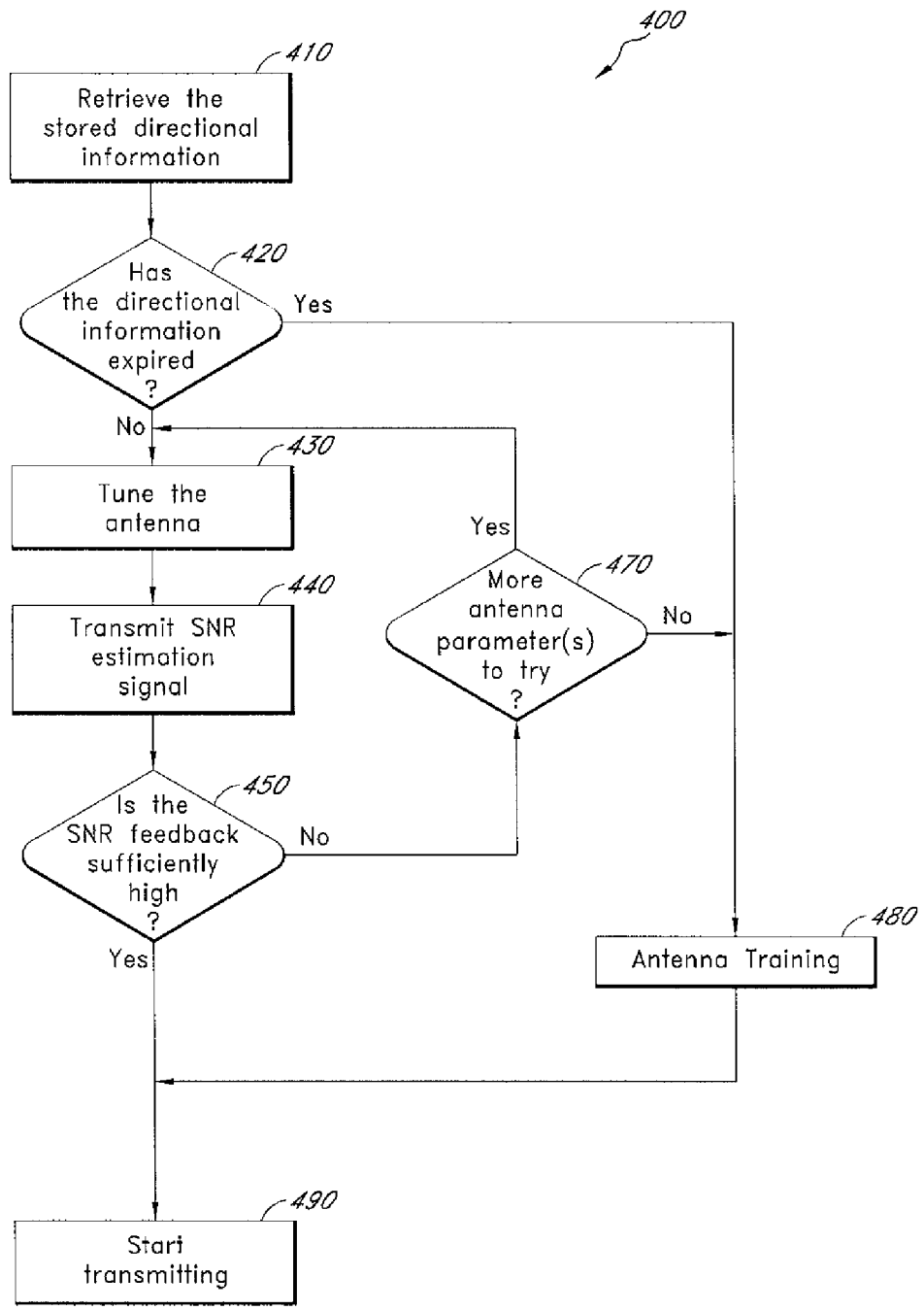
FIG. 4 is a flowchart illustrating an example process for a directional information reuse scheme from the point-of-view of a transmitter.

In the example shown in FIG. 4, the beamforming wireless system 400 is an analog beamforming wireless system. However, it will be appreciated that the system 400 can be a digital beamforming wireless system. It will also be appreciated that while the example shown in FIG. 4 focuses on an embodiment in which antennas at the transmitter and receiver are both beamforming antenna arrays, the directional information reuse scheme to be described below applies to embodiments in which the transmit and receive antennas are both sector antennas and also to embodiments in which the transmit antennas and the receive antennas are of different types, e.g., a phased antenna array at the transmitter and a switched antenna array at the receiver. In case of switched antenna array, the antenna training includes antenna scanning. Both the transmit and the receive antennas can scan, though possibly at different speed, such that every possible combination of transmit sector and receive sector is experienced to find the best combination of transmit and receive sector. The antenna training for the phased antenna array is to train the antennas so that the best antenna coefficients are found. Both methods require a significant overhead. For example, in the WirelessHD (WiHD) specification 1.0, the antenna training overhead can be as long as 400 μs.

Directional information is used to represent beam directions for directional antennas such as switched antenna array and phased antenna array in a communication pair comprising a transmitter and a receiver. The primary purpose of the relatively lengthy antenna training process is to acquire proper directional information. The directional information, once acquired, can be outdated in time due to, for example, movement of one or both stations of the communication or a change of channel. In the current WiHD protocol, for example, every time a pair of devices wants to communicate with each other, they have to do antenna training first.

In certain embodiments, directional information for a station including, e.g., antenna coefficient vector or sector antenna direction, for different devices which the station has communicated with within a certain time frame is stored. The time frame may be determined by the channel coherence time during which the channel gain stays roughly unchanged. The coherence time depends on the moving speed of the mobile station and the wavelength. For relatively stationary devices, an example value can be several milli-seconds. In some embodiments, directional information for a transmitter with respect to a particular receiver is stored in the transmitter and directional information for a receiver with respect to a particular transmitter is stored in the receiver. In other embodiments, directional information for both the transmitter and receiver with respect to each other is stored in either the transmitter or the receiver or both. In yet other embodiments, directional information for a transmitter and a receiver is stored in a coordinator and transmitted to the transmitter and the receiver prior to the signal estimation procedure to be described below. As shown in Tables 1 and 2 below, the directional information can include a plurality of antenna parameters such as sector numbers in the case of sector antennas and beamforming vectors in case of beamforming antenna arrays.

TABLE 1

Directional information for sector antennas

| MAC address | Device type or device order ID | Antenna Sector No. | Updated time |
|---|---|---|---|
| x.x.x.x | S | Sector: K1, K2, . . . , Km | T1 |

TABLE 2

Directional information for phased antenna arrays

| MAC address | Device type or device order ID | Antenna array coefficients. | Updated time |
|---|---|---|---|
| x.x.x.x | M | Vector: V1, V2, . . . , Vm | T2 |

For example, directional information for a sector antenna (Table 1) can include the sector numbers Ki, where i=1 . . . m. In certain embodiments, the sector numbers are prioritized in the order of signal-to-noise ratio (SNR) values or antenna gains. In such embodiments, for example, K1 represents the best direction to reach the receiver, K2 represents the second best, and so on and so forth. The total number of sectors, m, is implementation dependent, with m=2 being a common example implementation. The directional information for the sector antenna can also include an updated time which indicates the time at which the directional information, e.g., the sector numbers, were last updated, which may coincide with the completion time of a previous antenna training session. Similarly, directional information for a phased antenna array (Table 2) can include beamforming (BF) vectors Vi where i=1 . . . m. In some embodiments, the BF vectors are prioritized in the order of signal-to-noise ratio (SNR) values or antenna gains. The directional information for the BF antenna array can also include an updated time which indicates the time at which the directional information, e.g., the BF vectors, were last updated, which may coincide with the completion time of a previous antenna training session.

Due to the mobility of the stations and the change of the wireless environment, the directional information can become obsolete. For stationary stations, the directional information can remain valid for a relatively longer time than for mobile stations. The device type or device order ID, e.g., S or M, can be used to determine if the station is stationary (S) or mobile (M) and accordingly the time to expire the directional information.

When a pair of transmitter and receiver wants to start a new transmission session, they first check to determination if the directional information has expired or not. In certain embodiments, the transmitter and the receiver both have stored directional information obtained from a past antenna training session with each other. If the directional information has not expired, the stations 311, 312 perform a signal-to-noise (SNR) estimation procedure to determine if one or more of the antenna parameters can be reused. In certain embodiments, the reuse determination can include estimating an SNR value from a probe message transmitted by the transmitter 311 via a transmit antenna 313a tuned to an existing directional information and received by the receiver 312 via a receive antenna 313b tuned to an existing directional information. If the estimated SNR value exceeds the threshold SNR value, the stations may declare that it is feasible to reuse the directional information and can start transmitting data via transmit and receive antennas tuned to their respective existing directional information, e.g., a sector number or a beamforming vector.

FIG. 4 is a flowchart illustrating an example process 400 for a directional information reuse scheme from the point-of-view of a transmitter. The process 400 starts at a state 410, where existing directional information for a transmit antenna, such as the transmit antenna 313a (FIG. 3), is retrieved. The existing directional information can be stored in a non-volatile memory in the transmitter 311 (FIG. 3). The process 400 proceeds to a decision state 420, where it is queried whether the retrieved directional information for the transmit antenna has expired. This determination can include comparing the time elapsed since the updated time to an expiration time. In some embodiments, the expiration time can depend on whether the transmitter 311 is mobile or stationary, which can be determined from the device type or device order ID part of the directional information (Tables 1 and 2). If the answer to the query at decision state 420 is yes (directional information has expired), the process proceeds to a state 480, where a new antenna training is performed and the directional information is updated and, subsequently, to a state 490, where the transmitter 311 begins to transmit data signal via the transmit antenna 313a tuned with the updated directional information. In certain embodiments, the new antenna training necessitated by the expired directional information uses an iterative antenna training algorithm. In some of such embodiments, the existing directional information may be used as a "seed" value or setting for initial tuning of the transmit antenna 313a, thereby increasing the likelihood of a faster convergence.

On the other hand, if the answer to the query at decision state 420 is no (the directional information has not expired), the process 400 enters a signal-to-noise ratio (SNR) estimation procedure at a state 430, where the transmit antenna 313a is tuned with the existing and unexpired directional information. The process 400 within the SNR estimation procedure then proceeds to a state 440, where an SNR estimation signal is transmitted via the transmit antenna 313a tuned with the existing directional information. The process 400 within the SNR estimation procedure then proceeds to a decision state 450, where it is determined whether the SNR feedback is sufficiently high. In certain embodiments, this determination can be achieved from information associated with the transmitted SNR estimation signal contained in a feedback message received from the receiver 313. In some of those embodiments, the information may include an SNR value estimated by the receiver as will be discussed below with respect to FIG. 5. The estimated SNR value thus obtained is compared to a threshold SNR value by a processor at the transmitter 311. In other embodiments, the information may include data indicative of whether the estimated SNR value exceeds a threshold SNR value. Such data can be generated by a processor or other hardware, e.g., a comparator, at the receiver 312.

If the answer at decision state 450 is no (SNR feedback not sufficiently high), the process 400 proceeds to another decision state 470, where it is determined whether there is another antenna parameter to try. As discussed above, antenna parameters can include prioritized sector numbers (Ki, i=1 . . . m) or prioritized beamforming (BF) vectors (Vi, i=1 . . . m), organized in the order of SNR values or antenna gains. If the answer at decision state 470 is no (no more antenna parameters to try), the SNR estimation procedure terminates, and the process 400 proceeds to the state 480, where a new antenna training is performed and the directional information is updated and, subsequently, proceeds to a state 490, where the transmitter 311 begins to transmit data signals via the transmit antenna 313*a* tuned with the updated directional information. If the answer at decision state 470 is yes (another antenna parameter to try), the process 400 loops back to the state 430, where the transmit antenna 313*a* is tuned with the other antenna parameter, and, subsequently, to the states 440 and 450. For example, assume that the SNR estimation signal transmitted via the transmit antenna tuned with a first antenna parameter (e.g., K1) failed to produce a sufficiently high SNR feedback. Instead of terminating the SNR estimation procedure to initiate a new antenna training at the state 480, the processor at the transmitter 311 uses a next antenna parameter (e.g., K2) in the set of prioritized antenna parameters to tune the transmit antenna 313*a* and transmit another SNR estimation signal via the newly tuned antenna. This parameter search loop comprising the states 430, 440, 450, and 470 continues until either one of the antenna parameters produces a sufficiently high SNR feedback or until none of the antenna parameters produces a sufficiently high SNR feedback. This parameter search loop to try additional parameters may lead to a reusable antenna parameter, for example, if there has been only a minor movement, e.g., a slight rotation, of the transmitter since the previous antenna training.

If the answer at the decision state 450 is yes (SNR feedback sufficiently high), the process 400 exits the SNR estimation procedure and proceeds to the state 490, where the transmitter starts to transmit data signals via the transmit antenna tuned with the existing directional information, thereby achieving reuse of directional information and associated channel time savings.

In alternative embodiments, the directional information reuse process 400 does not use the parameter search loop to try other antenna parameters (e.g., Ki, i=2 . . . m) when the first antenna parameter (e.g., K1) fails to produce a sufficiently high SNR feedback and, instead, proceeds straight to the state 480, where another antenna training is performed to obtain new directional information.

Figure 5:
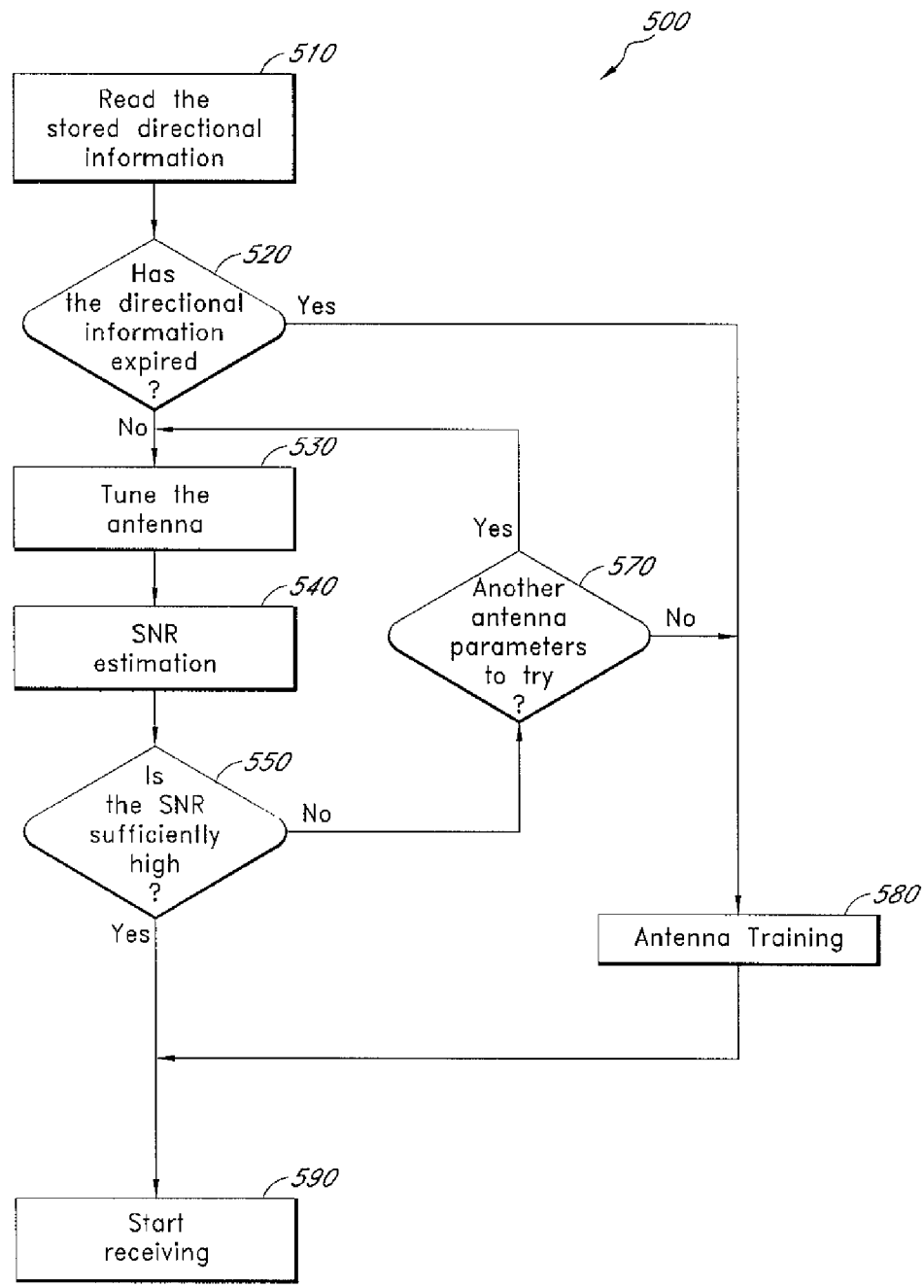
FIG. 5 is a flowchart illustrating an example process for a directional information reuse scheme from the point-of-view of a receiver.

FIG. 5 is a flowchart illustrating an example process 500 for a directional information reuse scheme from the point-of-view of a receiver. The process 500 starts at a state 510, where existing directional information for the receive antenna 313*b* (FIG. 3) is retrieved. The existing directional information can be stored in a non-volatile memory in the receiver 312. The process 500 proceeds to a decision state 520, where it is queried whether the retrieved directional information for the receive antenna has expired. As discussed above, this determination can include comparing the time elapsed since the updated time to an expiration time. In some embodiments, the expiration time can depend on whether the receiver 312 is mobile or stationary, which can be determined from the device type or device order ID part of the directional information (Tables 1 and 2). If the answer to the query at decision state 520 is yes (directional information has expired), the process proceeds to a state 580, where a new antenna training is performed and the directional information is updated and, subsequently, to a state 590, where the transmitter 311 begins to transmit data signals via the transmit antenna 313*a* tuned with the updated directional information.

On the other hand, if the answer to the query at decision state 520 is no (the directional information has not expired), the process 500 enters a signal-to-noise ratio (SNR) estimation procedure at a state 530, where the receive antenna 313*b* is tuned with the existing directional information. The process 500 within the SNR estimation procedure then proceeds to a state 540, where an SNR estimation takes place. In certain embodiments, the SNR estimation includes receiving a probe message from which SNR value is estimated. The probe message is transmitted by the transmitter 311 via the antenna tuned with the existing directional information. The process 500 within the SNR estimation procedure then proceeds to a decision state 550, where it is determined whether the estimated SNR is sufficiently high. This determination can include comparing the estimated SNR value to a threshold SNR value by a processor at the receiver 312. There are many techniques for estimating SNR values known in the art. One embodiment employs maximum-likelihood (ML) SNR estimator technique.

If the answer at decision state 550 is no (the estimated SNR value is not sufficiently high), the process 500 proceeds to another decision state 570, where it is determined whether there is another antenna parameter to try. As discussed above, antenna parameters can include prioritized sector numbers (Ki, i=1 . . . m) or prioritized beamforming (BF) vectors (Vi, i=1 . . . m), organized in the order of SNR values or antenna gains. If the answer at decision state 570 is no (no more antenna parameter to try), the SNR estimation procedure terminates, and the process 500 proceeds to the state 580, where a new antenna training is performed and the directional information is updated and, subsequently, proceeds to a state 590, where the receiver 312 begins to receive data signals via the receive antenna 313*b* tuned with the updated directional information. If the answer at decision state 570 is yes (another antenna parameter to try), the process 500 loops back to the state 530, where the receive antenna 313*b* is tuned with the other antenna parameter, and, subsequently, to the states 540 and 550. This parameter search loop comprising the states 530, 540, 550, and 570 continues until either one of the antenna parameters produces a sufficiently high SNR feedback or until none of the antenna parameters produces a sufficiently high SNR feedback.

If the answer at the decision state 550 is yes (SNR feedback sufficiently high), the process 500 exits the SNR estimation procedure and proceeds to the state 590, where the receiver 312 starts to receive data signals via the receive antenna 313*b* tuned with the existing directional information, thereby achieving reuse of directional information and associated scanning time savings.

In certain embodiments, the receiver 312 conducts the parameter search loop for trying to receive the SNR estimation signal via the receive antenna 313*b* tuned with additional receive antenna parameters while the transmitter 311 continues to transmit the SNR estimation signals via the transmit antenna 313*a* tuned with a fixed transmit antenna parameter. After each iteration, the receiver 312 may transmit an SNR feedback message to the transmitter 311 to inform the transmitter as to whether a sufficiently high estimated SNR value has been achieved with the current combination of antenna parameters. If the particular combination of the transmit and receive antenna parameters has failed to produce a sufficiently high SNR value, the transmitter 312 may continue to transmitting additional SNR estimation signals until one of the additional receive antenna parameters produces a sufficiently high SNR value or until none of the receive antenna parameters produces a sufficiently high SNR value. The SNR feedback message includes data indicating either of these conditions to allow the transmitter to terminate transmission of the additional SNR estimation signals.

In alternative embodiments, the directional information reuse process 500 does not use the parameter search loop to try other antenna parameters (e.g., Ki, i=2 . . . m) when the first antenna parameter (e.g., K1) fails to produce a sufficiently high SNR feedback and, instead, proceeds straight to the state 580, where another antenna training is performed to obtain new directional information. In other embodiments, only one of the transmitter and receiver 311, 312 conducts the parameter search loop.

The above-described directional information reuse scheme may be realized in a program format to be stored on a computer readable recording medium that includes any kinds of recording devices for storing computer readable data, for example, a CD-ROM, a DVD, a magnetic tape, a memory (e.g., capable of storing firmware), memory card and a disk, and may also be realized in a carrier wave format (e.g., Internet transmission or Bluetooth transmission.) In some embodiments, the coordinator 112 or the non-coordinator station 114 shown in FIG. 1 includes the computer readable recording medium and can also include a processor, controller, or other computing device and a memory.

CONCLUSION

While the above detailed description has shown, described, and pointed out the fundamental novel features of the invention as applied to various embodiments, it will be understood that various omissions and substitutions and changes in the form and details of the apparatus illustrated may be made by those skilled in the art, without departing from the intent of the invention.

What is claimed is:

1. A method of reusing existing directional information to configure antennas in a wireless network, the method comprising:
    retrieving existing directional information, the existing directional information having been established in a previous antenna training session with a receiver;
    performing a signal-to-noise ratio (SNR) estimation procedure comprising:
        transmitting an SNR estimation probe message to the receiver via a directional antenna tuned with the existing directional information, and
        determining whether an estimated SNR value associated with the SNR estimation probe message is equal to or greater than a threshold SNR value; and transmitting a data message to the receiver via the directional antenna tuned with the existing directional information if it is determined that the estimated SNR value is equal to or greater than the threshold SNR value.

2. The method of claim 1, further comprising determining that the existing directional information has not expired before performing the SNR estimation procedure.

3. The method of claim 1, wherein the SNR estimation procedure further comprises receiving an SNR feedback message from the receiver, wherein the SNR feedback message comprises data indicative of the estimated SNR value.

4. The method of claim 1, wherein the SNR estimation procedure further comprises receiving an SNR feedback message from the receiver, wherein the SNR feedback message comprises data indicative of whether the estimated SNR value is equal to or greater than the threshold SNR value.

5. The method of claim 1, wherein the existing directional information comprises a set of prioritized antenna parameters and the SNR estimation procedure comprises:
    a) transmitting a SNR estimation probe message to the receiver via a directional antenna tuned with a next prioritized antenna parameter;
    b) receiving a new SNR feedback message from the receiver; and
    c) repeating a)-b) until the new SNR feedback message indicates that a sufficiently high SNR value has been achieved.

6. The method of claim 5, wherein the set of prioritized antenna parameters comprise sector numbers associated with a sector antenna, the sector numbers having been prioritized in the order of decreasing signal-to-noise ratio (SNR) values or antenna gains.

7. The method of claim 5, wherein the plurality of prioritized antenna parameters comprise vector numbers associated with a beamforming antenna array, the vector numbers having been prioritized in the order of decreasing signal-to-noise ratio (SNR) values or antenna gains.

8. The method of claim 1, further comprising performing a new antenna training session if the estimated new SNR value is less than a threshold SNR value.

9. The method of claim 8, wherein the new antenna training session begins with the directional antenna initially configured with the existing directional information.

10. A method of reusing existing directional information to configure antennas in a wireless network, the method comprising:
    retrieving existing directional information, the existing directional information having been established in a previous antenna training session with a transmitter;
    performing a signal-to-noise ratio (SNR) estimation procedure comprising:
        receiving a SNR estimation probe message from the transmitter via a directional antenna tuned with the existing directional information, and
        estimating a SNR value associated with the received SNR estimation probe message; and
    receiving data from the transmitter via the directional antenna tuned with the existing directional information if it is determined that the estimated SNR value is equal to or greater than a threshold SNR value.

11. The method of claim 10, further comprising determining that the existing directional information has not expired before performing the SNR estimation procedure.

12. The method of claim 10, wherein the existing directional information comprises a plurality of prioritized antenna parameters and the SNR estimation procedure comprises:
    a) receiving an SNR estimation probe message from the transmitter via a directional antenna tuned with a next prioritized antenna parameter, and
    b) estimating a new SNR value associated with the received SNR estimation probe message; and
    c) repeating a)-b) until it is determined that the estimated new SNR value is equal to or greater than a threshold SNR value.

13. The method of claim 10, further comprising transmitting an SNR feedback message to the transmitter, wherein the SNR feedback message comprises data indicative of whether the estimated SNR value is equal to or greater than a threshold SNR value.

14. The method of claim 10, further comprising transmitting an SNR feedback message to the transmitter, wherein the SNR feedback message comprises data indicative of the estimated SNR value.

15. The method of claim 10, further comprising performing a new antenna training session if the estimated new SNR value is less than a threshold SNR value.

16. The method of claim 15, wherein the new antenna training session begins with the directional antenna initially configured with the existing directional information.

17. A data communication station in a wireless network comprising:
a memory configured to store existing directional information, the existing directional information having been established in a previous training session with a receiver;
a processor in data communication with the memory and configured to:
retrieve the existing directional information, and
determine whether an estimated SNR value associated with a SNR estimation probe message transmitted to a receiver equal to or greater than a threshold SNR value; and
a directional antenna in data communication with the processor and configured to transmit data to the receiver after having been trained with the existing directional information if it is determined that the estimated SNR value is equal to or greater than the threshold SNR value.

18. The data communication station of claim 17, wherein the existing directional information comprises a set of prioritized antenna parameters.

19. The data communication station of claim 18, wherein the directional antenna comprises a sector antenna, and the set of prioritized antenna parameters comprises sector numbers prioritized in the order of decreasing signal-to-noise ratio (SNR) values or antenna gains.

20. The data communication station of claim 18, wherein the directional antenna comprises a beamforming antenna array, and the set of prioritized antenna parameters comprises beamforming vectors prioritized in the order of decreasing signal-to-noise ratio (SNR) values or antenna gains.

21. The data communication station of claim 18, wherein the directional antenna comprises a beamforming antenna array and the set of one or more prioritized parameters include one or more beamforming vectors prioritized in the order of decreasing SNR values or antenna gains.

22. The data communication station of claim 17, wherein the processor is further configured to train the directional antenna via an iterative antenna training algorithm with the existing directional information as an initial setting if it is determined that the estimated SNR value is less than the threshold SNR value.

23. The data communication station of claim 17, wherein: the memory is further configured to store an expiration time associated with the existing directional information; and the processor is further configured to compare the time elapsed since the previous training session to the stored expiration time to determine whether the existing direction information has expired.

24. The data communication station of claim 23, wherein the expiration time for the directional information is determined at least partly based on whether one or both of the pair of stations is stationary or mobile.

25. A data communication station in a wireless network comprising:
a memory configured to store existing directional information, the existing directional information having been established in a previous training session with a transmitter;
a processor in data communication with the memory and configured to:
retrieve the existing directional information, estimate a SNR value associated with a received SNR estimation signal from the transmitter, and
determine whether the estimated SNR value is equal to or greater than a threshold SNR value; and
a directional antenna in data communication with the processor and configured to receive data packets from the transmitter after having been trained with the existing directional information if it is determined that the estimated SNR value is equal to or greater than the threshold SNR value.

26. The data communication station of claim 25, wherein the processor is further configured to transmit an SNR feedback packet to the transmitter, wherein the SNR feedback message comprises data indicative of whether the estimated SNR value is equal to or greater than at least one of a threshold SNR value and data indicative of the estimated SNR value.

27. A data communication station in a wireless network comprising:
a data storage configured to store existing directional information from a previous antenna training session with a transmitter; and
a processor configured to execute at least part of a computer algorithm configured to determine whether to reuse the existing directional information to tune a directional antenna for data communication based at least in part on whether a signal-to-noise ratio (SNR) estimation probe message transmitted or received via one or more directional antennas tuned with the existing directional information yields an estimated SNR value that is equal to or greater than a threshold SNR value.

28. A system a wireless network comprising:
a receiver that stores existing directional information from a previous antenna training session with a transmitter; and
a processor configured to execute at least part of a computer algorithm configured to determine whether to reuse the existing directional information to tune a directional antenna for data communication based at least in part on whether a signal-to-noise ratio (SNR) estimation probe message transmitted or received via one or more directional antennas tuned with the existing directional information yields an estimated SNR value that is equal to or greater than a threshold SNR value.

29. A system a wireless network comprising:
a transmitter that stores existing directional information from a previous antenna training session with a receiver; and
a processor configured to execute at least part of a computer algorithm configured to determine whether to reuse the existing directional information to tune a directional antenna for data communication based at least in part on whether a signal-to-noise ratio (SNR) estimation probe message transmitted or received via one or more directional antennas tuned with the existing directional information yields an estimated SNR value that is equal to or greater than a threshold SNR value.

* * * * *